INVENTOR.
ERIC M. WORMSER
RUSSELL D. DE WAARD
BY ANDREW C. RUDOMANSKI

ATTORNEY

United States Patent Office 3,097,300
Patented July 9, 1963

3,097,300
THERMAL DETECTOR AND REFERENCE SOURCE
Eric M. Wormser, Stamford, Russell D. De Waard, Old Greenwich, and Andrew C. Rudomanski, Stamford, Conn., assignors to Barnes Engineering Company, Stamford, Conn., a corporation of Delaware
Filed Oct. 6, 1960, Ser. No. 60,878
4 Claims. (Cl. 250—83.3)

This invention relates to an improved radiation detector using a controlled temperature "black body" reference source.

A great many infrared instruments operate by chopping incoming infrared radiation and comparing it, at chopping frequency, with a reference source of radiation for which temperature controlled black bodies are ordinarily used. Among the most effective black body sources are cavities, for example, conical cavities of materials having an emissivity approaching that of a black body. The multiple reflections and reradiations from the cavity walls result in a close approximation of perfect black body radiation.

The infrared instruments normally are provided with mirror choppers which alternately reflect the black body source onto the radiation detector and permit the radiation from the object to be investigated to strike the detector during the opposite alternation. Even with a perfectly thermostated black body source these instruments are subject to certain drawbacks. For example, the mirror chopper itself may be at a slightly different temperature than the black body source, for it is impracticable to thermostat perfectly the whole instrument and there is no such thing as a perfect infrared mirror. As a result when reflecting reference source radiation on the detectors certain inaccuracies are encountered due to the emissive characteristics of the chopper itself. In many instruments the above drawbacks are tolerated and frequently the requirements for instrumental accuracy and reproducibility of results are such that the above limitations are not sufficiently serious so that the instruments cannot be used. In other cases instruments of higher precision, standards of reliability and reproducibility are more stringent and the instruments used in the past have not been completely satisfactory, and even in some cases do not permit certain types of measurements to be made at all with the required precision.

The present invention removes the above drawbacks from chopper radiation either to a very great extent or in certain modifications completely. At the same time it is possible to remove another type of variation due to changes in detector sensitivity as a result of temperature changes. Also the present invention permits the increased precision in a simple design which does not require complicated elements and which operates reliably in a compact instrument. Miniaturization is also possible to an extent which is important for certain uses.

Essentially, in its broadest aspects, the invention accomplishes the elimination of serious chopper radiation errors by making the mirror of the chopper for practical purposes a wall of the reference cavity. In such a manner there is a radiation equilibrium set up and spurious radiations from the chopper or from other parts of the instrument during the reference measurement are either completely eliminated or reduced to so low a figure that they are negligible. If the mirror blades of the chopper were perfect reflectors in the infrared elimination of spurious results would be complete regardless of the temperature of the chopper itself. Of course, this is an ideal which does not exist in practice. All infrared mirrors do have some emission. On the other hand, when the chopper is made part of the wall of the reference cavity it is so closely associated therewith that it will rarely show any substantial difference in temperature. Where the absolute maximum of accuracy is required the chopper may actually be immersed in the cavity and so be at exactly the same temperature, in which case the correction of the errors will be complete. In some of the simpler modifications this may require some sacrifice of detector sensitivity which in many instruments is not a significant problem or a somewhat more complex instrument can provide a similar complete elimination of chopper radiation regardless of how imperfect a mirror surface it may have and it can even be black although this presents no real advantage. In a great many cases the simpler modification will reduce error to the point where it is not worthwhile to go to extremes, and so to an extent the degree of perfection in the correction involves an economic choice and may be dictated by the cost of the instrument versus its requirements.

The problem of detector sensitivity while in a sense entirely separate from that of chopper radiation is fortunately also soluble in the instruments of the present invention. In most cases it is not only possible but actually easier and simpler to incorporate the detector in a wall of the black body source or inside the latter where, of course, it may remain at substantially the temperature of the black body source itself. It is an advantage of the present invention that some of the simplest embodiments permit correction also for detector sensitivity variations with temperature.

Theoretically the shape of the reference black body cavity is more or less immaterial. However, the simplest instruments of the present invention utilize a conical cavity with the apex slightly truncated and receiving the detector. The chopper then moves across the open end of the cone and when in its closed position its blade forms a wall of the cavity, in this case the base of the cone. It should be understood that the invention is not limited to the use of a conical cavity but for compact instruments this form has advantages and is preferred.

The invention will be described in greater detail in conjunction with the drawings in which.

Figure 1:
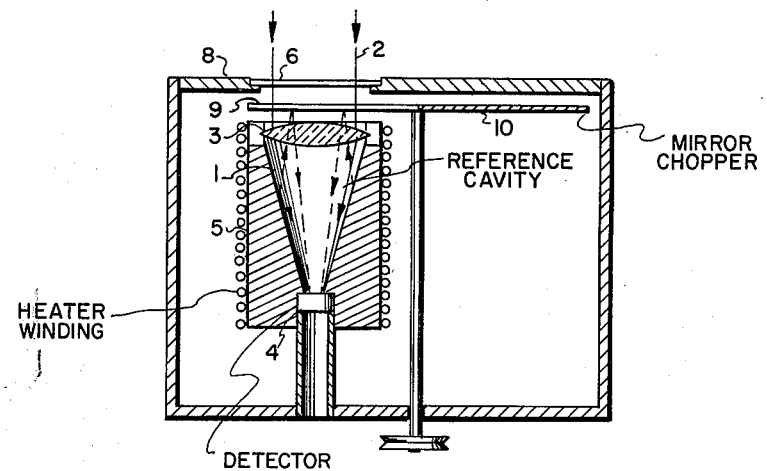
FIG. 1 is a section through a conical black body source.

FIG. 1 illustrates a very simple and compact modification of the present invention. The cavity itself is shown at 1 with a detector 4 at its apex and a lens 3 near the base of the cavity. Thermostating is effected by means of the heater winding 5 and the whole device is mounted in an enclosure 8 provided with a window 6 through which the radiation to be measured passes. The radiation is illustrated diagrammatically as a collimated beam 2. A chopper rotates across the base of the cavity and is provided with mirrored blades 10 and clear portions or openings 9. When the mirror blade is across the cavity opening it forms a wall of the cavity itself and even though not an absolutely perfect infrared reflector it is so nearly the temperature of the cavity that changes in emission from the mirrored blades with environmental changes in the instrument are reduced to an extremely low minimum. At the same time the detector 4 is also effectively thermostated and so variations in detector sensitivity due to changes in temperature of the detector are reduced to an absolute minimum. When the mirror blade of the chopper closes the base of the cone the detector sees nothing but the lens 3 and the chopper mirror. The lens is, of course, at the same temperature as the body itself and so it radiates, reflects and transmits from the mirror at the same total intensity as there is complete equilibrium between it and the walls. As described above any slight change in temperature of the chopper introduces an extremely small error as the mirror is, of course, chosen for adequate quality.

Figure 2:
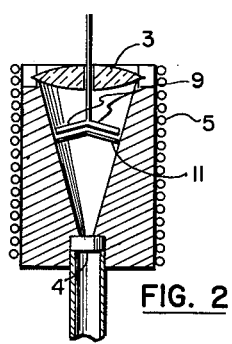
FIG. 2 is a section through a modified form of conical cavity.
Figure 3:
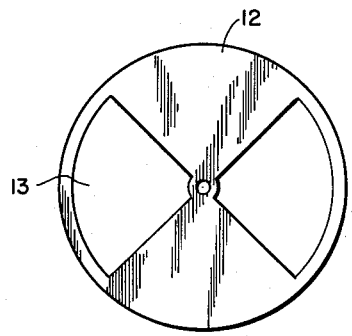
FIG. 3 is a plan view of the chopper for FIG. 2.

FIG. 1 illustrates a modification which is highly effective, very simple and compact and represents the simplest and cheapest embodiment of the present invention which is usable in the majority of instruments where the absolute limit in accuracy is not required. A few instruments, however, do require even higher accuracies and for these the modifications of FIGS. 2 to 4 may be used. FIG. 2 shows a modified cavity, the same parts bearing the same reference numerals. As the only difference is in the cavity the details of surrounding housing and window are not shown. The essential difference from FIG. 1 is that the shaft of the chopper extends through the center of the lens 3 and the chopper is closely adjacent to a mask 11. As before the chopper is composed of blades 9 and 10 which alternately pass radiation and reflect. The blades are not quite flat as in FIG. 1 which is an alternative shape and permits adapting the chopper easily to more nearly ideal wave form. The mask has a pair of blades and a pair of openings which are shown in FIG. 3 at 12 and solid segments 13. The solid segments have a reflecting surface on their upper side. The lower side does not have to be a mirror as it is completely thermostated. The device of FIGS. 2 and 3 gives perfect correction as far as the chopper is concerned but does this at a loss in energy which is about half. In many instruments the additional accuracy and precision are well worth the energy loss which often can be compensated for by larger or faster collecting optics.

Figure 4:
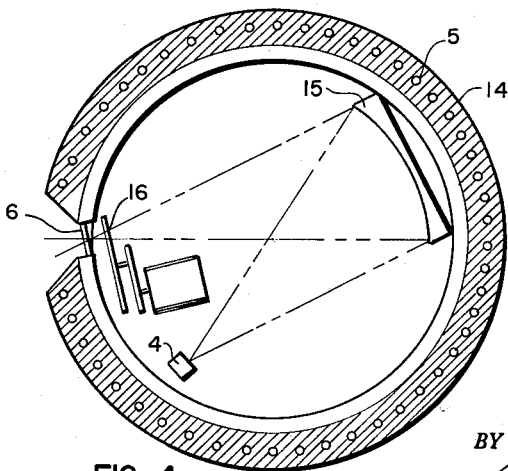
FIG. 4 is a section through a more elaborate, completely thermostated instrument.

A very perfect device is shown in FIG. 4. Here the cavity is in the form of a sphere 1 surrounded by an insulating body 14 carrying the heating wires 5. A small opening is provided with a window 6 and radiation entering through this opening strikes the converging mirror 15 and is imaged on the detector 4. A very small chopper is located near the window and is of the same design as that in FIG. 1. FIG. 4 represents the ultimate in complete thermostating and produces practically 100 percent precision although at the expense of a somewhat more complicated and somewhat more expensive instrument.

This application is in part a continuation of our co-pending application, Serial No. 840,401 filed September 16, 1959.

We claim:

1. A radiation detecting device comprising in combination and in optical alignment a black body reference cavity, a chopper and a detector, the chopper comprising alternating transmitting and opaque sectors, the opaque sectors forming one wall of the cavity.

2. A radiation detector according to claim 1 in which the opaque sectors have at least one mirrored surface.

3. A detecting device for infrared according to claim 1 in which the chopper is located within the body of the cavity and is therefore maintained at the same temperature.

4. An infrared detecting system according to claim 1 in which the detector is maintained at the temperature of the cavity walls.

References Cited in the file of this patent

UNITED STATES PATENTS

| | | |
|---|---|---|
| 2,742,578 | Nicolson et al. | Apr. 17, 1956 |
| 2,895,049 | Astheimer et al. | July 14, 1959 |